United States Patent

Chen

[11] Patent Number: 5,946,120
[45] Date of Patent: Aug. 31, 1999

[54] WIRELESS COMMUNICATION SYSTEM WITH A HYBRID OPTICAL AND RADIO FREQUENCY SIGNAL

[75] Inventor: Howard Zehua Chen, Berkeley Heights, N.J.

[73] Assignee: Lucent Technologies Inc., Murray Hill, N.J.

[21] Appl. No.: 08/865,926

[22] Filed: May 30, 1997

[51] Int. Cl.[6] .................................................. H04B 10/00
[52] U.S. Cl. .......................... 359/158; 359/145; 370/277; 375/354; 455/151.2; 340/825.72
[58] Field of Search .................................. 359/145, 152, 359/158, 172; 370/277, 310; 375/354–355; 455/151.2; 340/825.72

[56] References Cited

U.S. PATENT DOCUMENTS

| | | | |
|---|---|---|---|
| 4,904,993 | 2/1990 | Sato | 359/145 |
| 5,034,997 | 7/1991 | Iwasaki | 455/617 |
| 5,404,572 | 4/1995 | Ishii | 359/145 |
| 5,500,639 | 3/1996 | Walley et al. | 359/145 |
| 5,585,953 | 12/1996 | Zavrel | 359/152 |

*Primary Examiner*—Kinfe-Michael Negash

[57] ABSTRACT

A digital communication system for transmitting and receiving a hybrid optical and RF communication signal. The system includes a hybrid transmitter that incorporates an optical transmitter, an RF transmitter, and a transmitter control unit that controls both transmitters. Similarly, a hybrid receiver includes an optical receiver and an RF receiver, both connected to a receiver control unit. When an optical carrier signal is transmitted to the optical receiver by the optical transmitter, the transmitter control unit causes the RF transmitter to transmit an RF synchronization signal along with the carrier to provide a timing base for the digital pulses carried by the optical signal. The receiver control unit uses the timing parameters from the RF signal to reconstruct the received optical carrier signal that may have deteriorated during the transmission due to ambient optical noise, attenuation or obstructing objects. The RF synchronization signal does not carry modulated data, and is thus a narrow bandwidth signal that occupies a small spectrum that may be shared by many such hybrid communication systems in a small area.

8 Claims, 1 Drawing Sheet

WIRELESS COMMUNICATION SYSTEM WITH A HYBRID OPTICAL AND RADIO FREQUENCY SIGNAL

BACKGROUND OF THE INVENTION

1. Field of the Invention

The present invention relates to improving the accuracy and reliability of transmission of free-space optical digital communication signals. More particularly, the present invention is directed to a system and method for synchronizing transmitted optical digital communication signals by simultaneously transmitting a radio frequency timing signal.

2. Description of the Related Art

Wireless digital communication has been typically implemented through the use of radio frequency (hereinafter "RF") communication systems. RF systems have the advantages of range, reliability and relatively low cost. However, the available RF spectrum is quite limited due to FCC regulations. Furthermore, RF communication generates and is affected by electromagnetic noise. As a result, in recent years various alternatives to RF communication, for least short-range applications, have been developed. One such technology, optical free-space digital communication, has begun to gain recognition due to the advantages it offers over RF communication. Unlike radio frequency communication systems, optical free-space digital communication systems do not cause and are not affected by electromagnetic interference and are not regulated by the FCC. Optical communication systems use infrared ("IR") spectrum light to transmit and receive digital information between a transmitter and a receiver on an optical carrier in the form of digital pulses stored in a sequence of "frames". Most commonly, the relative position of each digital pulse within its frame is encoded in a binary "word" as a sequence of binary digits. Each word is transmitted by the transmitter along with its corresponding frame. The words serve as synchronization signals for transmitter-receiver synchronization by enabling the receiver to determine the position of each digital pulse within its frame and to anticipate the next digital pulse, thus improving the accuracy of optical free-space communication. In a typical optical digital communication system, both the digital pulses and the timing base of the frames (i.e., the words) are carried by optical radiation. An example of such an arrangement is a PPM or Pulse Position Modulation system, in which a single digital pulse is transmitted within each frame, and the position of each pulse relative to the boundaries of its frame is encoded in a binary word that is transmitted along with each frame. Each word is then decoded by the receiver so as to locate and acquire the digital pulse within the word's corresponding frame.

Optical free-space digital communication systems, however, suffer from several significant disadvantages. For example, ambient optical noise, such as proximal light sources, can significantly affect a system's accuracy and reliability by distorting the optical signal and making transmitter-receiver synchronization difficult to achieve. In the presence of ambient optical noise, the receiver often encounters difficulties in accurately determining the boundaries of each frame in the optical carrier signal, whereby some digital pulses may be misinterpreted or lost. Furthermore, mobile and stationary objects that obstruct an optical signal can further disrupt the synchronization process. Finally, optical signals quickly attenuate in free space, thus further distorting the signal received by the receiver.

Various error-correction techniques have been developed to reconstruct a received optical carrier at the receiver. While digital pulses can be reconstructed with some effort, it is very difficult to reconstruct timing or frame definition signals of a carrier, and thus the positions of the digital pulses, with sufficient accuracy.

It would thus be desirable to provide a system and method for optically transmitting digital data along with a synchronization signal which is unaffected by ambient optical noise and by obstructing objects.

SUMMARY OF THE INVENTION

The disadvantages and limitations discussed above are overcome by the present invention. The invention provides an optical communication system that includes a hybrid transmitter which incorporates an optical transmitter, a RF transmitter, and a transmission control unit that controls both transmitters. It further includes a hybrid receiver, including an optical receiver and a RF receiver both connected to a receiver control unit. When an optical carrier signal is transmitted to the optical receiver by the optical transmitter, the transmission control unit causes the RF transmitter to transmit an RF synchronization signal along with the carrier to provide a timing base for the digital pulses carried by the optical signal. The RF signal may be transmitted continuously or at predetermined periods for the duration of transmission of the optical carrier signal. The receiver control unit uses the timing parameters from the RF signal to reconstruct the received optical carrier signal which may have deteriorated during the transmission due to ambient optical noise, attenuation or obstructing objects—factors which have no effect on the RF synchronization signal. The RF synchronization signal does not carry modulated data, and is thus a narrow bandwidth signal that occupies a small spectrum that may be shared by many such hybrid communication systems in a small area. Because RF signals are unaffected by ambient optical noise and physical obstructions which cause deterioration or deflection of a pure optical signal, the hybrid optical/RF transmission combines the advantages of both optical and RF forms of wireless communication without the disadvantages of each. In accordance with the present invention, error-correction for optically transmitted digital pulses may advantageously be supplemented by RF signal based timing information, thus further enabling accurate and efficient reconstruction of the optical digital signal at a receiver.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PRESENTLY PREFERRED EMBODIMENTS

The present invention enables wireless transmission of a hybrid communication signal including an optical signal carrying digital data pulses and a radio frequency ("RF")

signal carrying corresponding timing or synchronization pulses. Such simultaneous transmission of data and synchronization signals in separate areas of the electromagnetic spectrum enables the system of the present invention to combine the advantages of both optical and RF data transmission technologies while avoiding the most significant drawbacks of each. While the system of the present invention is specifically described herein as using infrared or IR optical data transmission, it should be understood that other forms of free-space optical data transmission are likewise within the scope and contemplation of the invention. Furthermore, variables such as pulse amplitudes and pulse widths of the various digital signals are not described in detail as they will typically be selected as general matters of design choice.

Figure 1:
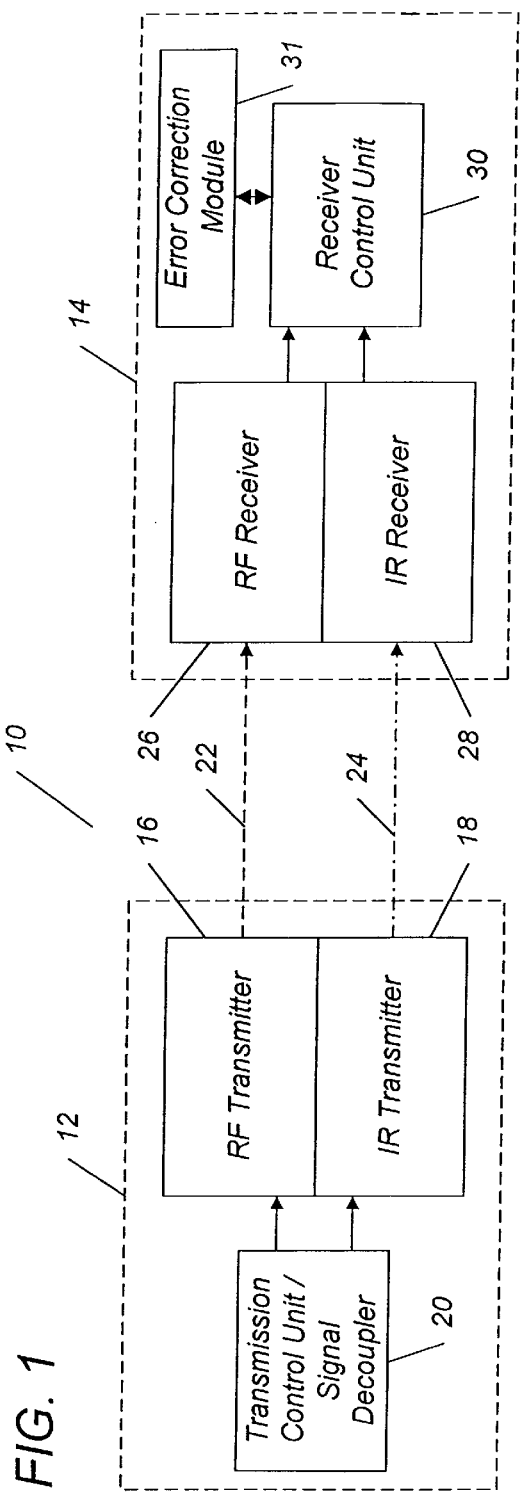
FIG. 1 is a block diagram of a digital communication system in accordance with the present invention.

Referring initially to FIG. 1, the inventive digital communication system 10 includes a hybrid transmitter 12 and a hybrid receiver 14 located in spaced apart relation to one another. The hybrid transmitter 12 incorporates an IR transmitter 18 for transmitting optical digital signals, an RF transmitter 16 for transmitting RF signals, and a transmission control unit 20 which controls both transmitters 16, 18. The transmission control unit 20 also includes signal decoupling circuitry for identifying and separating data pulses and synchronization pulses of a digital signal. The hybrid receiver 14 includes an optical receiver 28 for receiving optical digital signals and an RF receiver 26 for receiving RF signals, both connected to a receiver control unit 30 for controlling the receivers 26, 28.

The hybrid transmitter 12 is configured for receiving a digital signal from an external source (not shown), such as a signal processor, for wireless transmission of the signal to the hybrid receiver 14. A typical digital signal may be received by the hybrid transmitter 12 in a Pulse Position Modulation ("PPM") format that comprises digital data pulses positioned between synchronization or timing pulses (i.e., "frames"). Signal synchronization is important because when a digital signal is transmitted to a receiver through free space, the synchronization pulses enable the receiver to anticipate and recover the digital data pulses and thus to reconstruct the transmitted digital signal.

Figure 2:
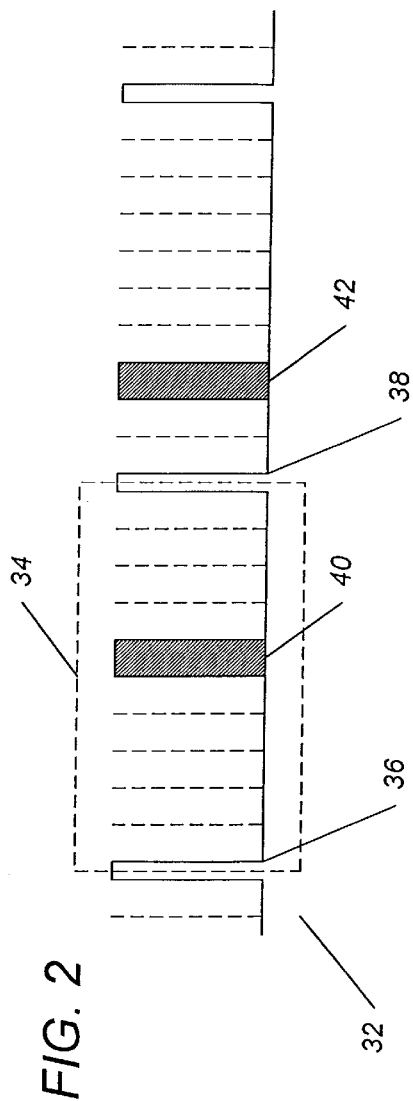
FIG. 2 shows an exemplary hybrid digital communication signal transmitted and received by the inventive system of FIG. 1.

FIG. 2 depicts a typical PPM digital signal 32. The signal 32 comprises a series of frames defined at their ends by synchronization pulses. For example a frame 34 is shown as defined by and between synchronization pulses 36 and 38. A digital data pulse is transmitted within each frame, shown by way of example, as data pulses 40 and 42. The PPM signal format facilitates reconstruction of a transmitted digital signal because a receiver will expect to receive a data pulse a certain time after a synchronization pulse is received. Thus, the accuracy and reliability of synchronization pulses are of particular importance. It should be noted that the optical carrier signal may be transmitted in any other digital signal modulation format that relies on transmitter-receiver synchronization, such as Frequency Shift Key-in (FSK).

Returning to FIG. 1, when the digital signal 32 is received by hybrid transmitter 12, the transmission control unit 20 decouples the digital signal 32 into separate sequences of data pulses 40, 42 and of corresponding synchronization pulses 36, 38. The transmission control unit then causes the IR transmitter 18 to transmit, to the IR receiver 28, the digital data pulses 40, 42 on an optical carrier signal 24 and, at the same time, causes the RF transmitter 16 to transmit to the RF receiver 26 the synchronization pulses 36, 38 on an RF carrier signal 22. The use of the RF carrier signal 22 is advantageous because it is unaffected by ambient optical noise and physical obstructions and is subject to only very minor attenuation. As a result, the RF carrier signal 22 provides a far more reliable synchronization signal than does a conventional optical signal. The RF carrier signal 22 is also preferably of low bandwidth and thus occupies only a small portion of the RF spectrum.

When the IR and RF carrier signals 24, 22 are received by the respective receivers 28, 26, the receiver control unit 30 reconstructs the digital signal 32 from the synchronization pulses 36, 48 and the data pulses 40, 42. This is a relatively simple task—for example, the receiver control unit 30 will anticipate the data pulse 40 on optical carrier 24 after the synchronization pulse 36 is received by RF receiver 26, and will likewise anticipate data pulse 42 after synchronization pulse 38 is received. An error-correction system of any suitable type and construction may optionally be provided in or associated with the receiver control unit 30 to aid in the reconstruction of lost or distorted data pulses. For example, an error-correction program may be implemented as part of a control program for the receiver control unit 30. Alternatively, a hardware based error-correction module 31 may be connected to the receiver control unit 30.

In another embodiment of the inventive system, the transmitter control unit 20 may be adjusted to cause the RF transmitter 16 to transmit the RF carrier signal 22 at predefined intervals during the transmission of the IR carrier signal 24, instead of transmitting the signal continuously. This approach lowers the power requirements of the RF transmitter 16 and further lessens local RF radiation.

Thus, the present invention provides a system for transmitting and receiving a hybrid digital communication signal formed of an optical data signal and an RF synchronization signal.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it will be recognized that constructions in which a receiver and a transmitter are both incorporated in a single physical unit or location—to enable both transmission and receipt of the hybrid digital communication signals with a remote location—are within the scope of the invention. Furthermore, it is expressly intended that all combinations of those elements and method steps which perform substantially the same function in substantially the same way to achieve the same results are within the scope of the invention. It is the intention, therefore, to be limited only as indicated by the scope of the claims appended hereto.

I claim:

1. A digital data communication system for transmitting and receiving a digital signal comprised of data pulses and corresponding synchronization timing pulses comprising:

hybrid signal transmitting means operable for deconstructing the digital signal into the data pulses and the corresponding synchronization timing pulses, and for simultaneously transmitting the data pulses via a digital optical signal and the corresponding synchronization timing pulses via a radio frequency signal; and hybrid signal receiving means, operable for receiving the digital optical signal and the radio frequency signal, and for reconstructing the digital signal from the digital optical signal and the radio frequency signal.

2. The digital data communication system of claim 1, wherein said hybrid signal transmitting means is further operable for transmitting the radio frequency signal at predefined intervals.

3. The digital data communication system of claim 1, wherein said hybrid signal transmitting means comprises:

means for deconstructing the digital signal into the data pulses and the corresponding synchronization timing pulses;

optical signal transmitting means, connected to said deconstructing means, operable for transmitting a digital optical data signal comprising the data pulses;

radio frequency signal transmitting means, connected to said deconstructing means, operable for transmitting a radio frequency synchronization signal comprising the corresponding synchronization timing pulses; and transmitter control means, connected to both the radio frequency and said optical signal transmitting means, operable for causing said optical signal transmitting means and the radio frequency signal transmitting means to simultaneously transmit the digital optical data signal and the radio frequency synchronization signal.

4. The digital data communication system of claim 1, wherein said hybrid signal receiving means comprises:

optical signal receiving means operable for receiving the digital optical data signal and for deriving the data pulses from the received digital optical data signal;

radio frequency signal receiving means operable for receiving the radio frequency synchronization signal and for deriving the corresponding synchronization pulses from the received radio frequency synchronization signal; and control means, connected to both the radio frequency and optical signal receiving means, operable for reconstructing the digital signal from the derived data pulses and the derived corresponding synchronization timing pulses.

5. The digital data communication system of claim 1, further comprising error correction means connected to said hybrid receiving means and operable to compensate for signal loss during transmission of the digital optical data signal from said hybrid transmitting means to said hybrid receiving means.

6. A method for transmitting and receiving a digital signal comprised of data pulses and corresponding synchronization timing pulses, comprising the steps of:

(a) deconstructing the digital signal into the data pulses and the corresponding synchronization timing pulses;

(b) transmitting the data pulses via a digital optical signal;

(c) simultaneously with said step (b), transmitting the corresponding synchronization timing pulses via a radio frequency signal;

(d) receiving the digital optical signal and the radio frequency signal; and (e) reconstructing the digital signal from the received digital optical signal and the received radio frequency signal.

7. The method of claim 6, wherein said step (c) further comprises the step of transmitting the radio frequency signal at predefined intervals.

8. The method of claim 6, further comprising the step of applying a predetermined error-correction technique to the received digital optical signal.

* * * * *